United States Patent
Jun et al.

(10) Patent No.: US 8,432,430 B2
(45) Date of Patent: Apr. 30, 2013

(54) APPARATUS AND METHOD FOR OPERATING PLURAL CAMERAS EMBEDDED IN MOBILE DEVICE

(75) Inventors: Ki Hyun Jun, Incheon (KR); Byung Hwa Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 12/925,109

(22) Filed: Oct. 14, 2010

(65) Prior Publication Data

US 2011/0085015 A1    Apr. 14, 2011

(30) Foreign Application Priority Data

Oct. 14, 2009  (KR) .................. 10-2009-0097744

(51) Int. Cl.
*H04N 7/14*  (2006.01)

(52) U.S. Cl.
USPC .............. 348/14.01; 348/14.02; 455/556.1

(58) Field of Classification Search .... 348/14.01–14.16; 455/404.1, 404.2, 556.1
See application file for complete search history.

(56) References Cited

U.S. PATENT DOCUMENTS

| | | | |
|---|---|---|---|
| 7,227,565 B2 * | 6/2007 | Kawahara | 348/14.02 |
| 2004/0145675 A1 * | 7/2004 | Kitada | 348/371 |
| 2007/0070204 A1 * | 3/2007 | Mentzer | 348/207.99 |

* cited by examiner

*Primary Examiner* — Melur Ramakrishnaiah (57) ABSTRACT

A mobile device includes an apparatus for operating two or more cameras embedded in a mobile device. When one of the cameras is enabled, the apparatus controls the flow of signals by preventing a signal in connection with the enabled camera from flowing toward other disabled cameras. This can minimize EMI that may be caused by such a signal.

20 Claims, 7 Drawing Sheets

APPARATUS AND METHOD FOR OPERATING PLURAL CAMERAS EMBEDDED IN MOBILE DEVICE

CROSS-REFERENCE TO RELATED APPLICATION(S) AND CLAIM OF PRIORITY

The present application is related to and claims the benefit of priority under 35 U.S.C. §119(a) to a Korean patent application filed in the Korean Intellectual Property Office on Oct. 14, 2009, and assigned Serial No. 10-2009-0097744, the entire disclosure of which is hereby incorporated by reference.

TECHNICAL FIELD OF THE INVENTION

The present invention relates in general to a mobile device and, more particularly, to an apparatus and method for operating two or more cameras embedded in a mobile device by controlling the flow of a signal related to the cameras in order to minimize EMI (electromagnetic interference) that may be caused by the signal.

BACKGROUND OF THE INVENTION

As well known in the art, a mobile device refers to a kind of electronic device based on mobility and portability. With remarkable growths of related technologies, a great variety of mobile devices capable of supporting various end-user functions are increasingly popularized in these days.

Normally almost all the mobile devices have at least one specific module that supports a particular end-user function. For instance, the mobile device may have an MP3 player module for playing a music file, a camera module for acquiring an image, and the like. In particular, the camera module is widely used in most mobile devices currently available on the market.

The mobile device in which the camera module is embedded may support a preview function to display on the screen a real-time image acquired by the camera module, and a saving function to save an acquired image at a user's request. Also, some mobile devices may support a video call using an additional camera module.

In such a mobile device, the camera module not only receives a control signal from a control unit, but also sends a signal of an acquired image to the control unit. However, the flow of these signals may often exert an adverse electromagnetic effect upon other elements in the mobile device. Therefore required is a way to minimize an adverse effect caused electromagnetically by the operation of a camera in the mobile device.

SUMMARY OF THE INVENTION

To address the above-discussed deficiencies of the prior art, it is a primary object to provide an apparatus and method for operating two or more cameras embedded in a mobile device by controlling the flow of a signal related to the cameras in order to minimize an adverse effect that may be caused electromagnetically by the signal.

According to one aspect of the present invention, provided is an apparatus for operating cameras in a mobile device, the apparatus includes: a first camera and a second camera each configured to offer an image acquisition function; a control unit configured to send and receive a signal to and from each of the first and second cameras; and a switch configured to perform switching under the control of the control unit so that a signal in connection with an enabled one of the first and second cameras may not be transmitted to an disabled one of the first and second cameras.

According to another aspect of the present invention, provided is a method for operating cameras in a mobile device, the method includes: receiving an input signal for enabling a specific one of plural cameras; enabling the specific camera in response to the input signal; and controlling the flow of signals so that a signal in connection with the enabled camera may not be delivered to disabled cameras and signal lines connected to the disabled cameras.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 1:
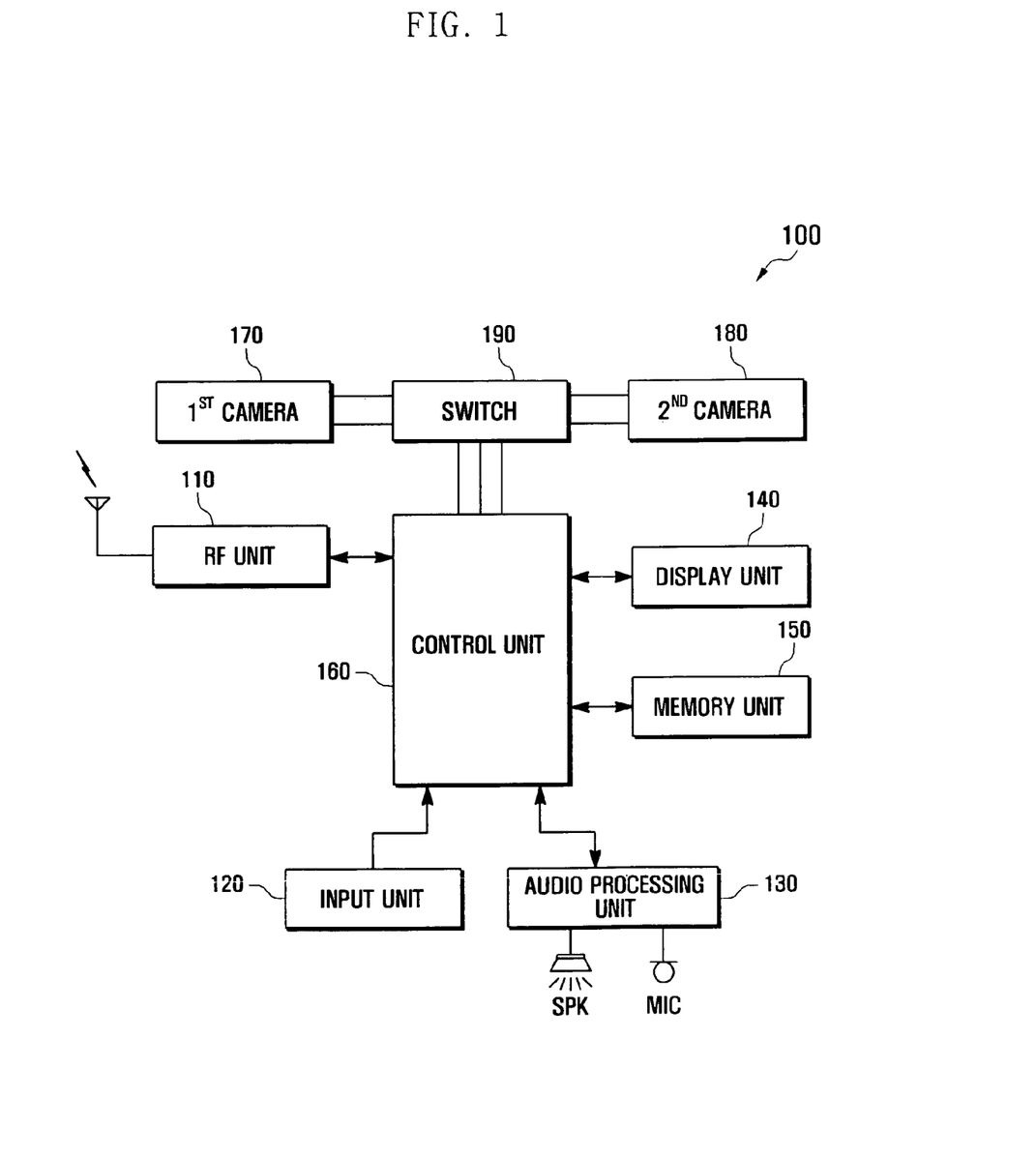
FIG. 1 illustrates a configuration of a mobile device in accordance with an exemplary embodiment of the present invention.

FIG. 1 illustrates a configuration of a mobile device in accordance with an exemplary embodiment of the present invention.

Referring to FIG. 1, the mobile device 100 according to an embodiment of this invention includes a radio frequency (RF) unit 110, an input unit 120, an audio processing unit 130, a display unit 140, a memory unit 150, a first camera 170, a second camera 180, a switch 190, and a control unit 160.

In brief, the mobile device 100 having the above configuration controls the flow of signals from and to a disabled one of the first and second cameras 170 and 180. Namely, when the only one of the first and second cameras 170 and 180 is enabled to perform a particular end-user function, the mobile device 100 blocks the flow of signals between the control unit 160 and the disabled camera. Therefore, the mobile device 100 may remove an electromagnetic effect caused by a signal transmitted to the disabled camera. Although this embodiment employs two cameras 170 and 180, the present invention is not limited thereto. Alternatively, three or more cameras may be embedded in the mobile device. In such cases, the mobile device 100 may control the flow of signals so that a signal produced in connection with an enabled camera may not be transmitted to other disabled cameras. Meanwhile, the enabled camera may be a specific one that offers a function dedicated to image acquisition. Also, the enable camera may offer a function capable of acquiring a higher-resolution image in comparison with other cameras embedded in the mobile device 100. Hereinafter, the first camera 170 is supposed to be able to acquire a high-resolution image above a given level that may have an effect on EMI of the mobile device 100. Now, each individual element of the mobile device 100 will be described in detail.

The RF unit 110 may establish communication channels with a base station to execute a data communication and a voice communication with other mobile devices. The RF unit 110 may include an RF transmitter that upwardly converts the frequency of signals to be transmitted and amplifies the signals, and an RF receiver that amplifies received signals with low-noise and downwardly converts the frequency of the received signals. Particularly, if the second camera 180 supports a video call, the RF unit 110 according to an embodiment of this invention may form a video call channel to send an image acquired by the second camera 180 to other mobile devices under the control of the control unit 160.

The input unit 120 may include a plurality of input keys and function keys to receive a user's input and to set various functions. The function keys may have navigation keys, side keys, shortcut keys, and any other special keys defined to perform particular functions. Additionally, the input unit 120 may create a key input signal in association with a function control of the mobile device 100 and then deliver it to the control unit 160. Specifically, the input unit 120 may create an input signal for enabling the first camera 170, an input signal for setting various environments of the first camera 170 such as setting ISO (international standardization organization), setting a shutter speed, setting a booster, setting a lamp, and so forth, an input signal corresponding to a shutter key to instruct the first camera 170 to acquire an image, and the like. Also, the input unit 120 may create an input signal for connecting a video call based on the second camera 180, an input signal for setting environments of the second camera 180, and the like. The input unit 120 may send such input signals to the control unit 160.

The audio processing unit 130 may output to a speaker (SPK) an audio signal received through the RF unit 110 or produced from an audio file stored in the memory unit 150, or transmit through the RF unit 110 an audio signal inputted from a microphone (MIC), under the control of the control unit 160. Additionally, the audio processing unit 130 may output sound effects in response to an input signal for controlling the first camera 170 such as sound effects by pressing a shutter key, sound effects by saving an acquired image, and the like. Also, if one of the first and second cameras 170 and 180 is enabled, the audio processing unit 130 may let a user know a specific end-user function supported by the enabled camera 170 or 180.

The display unit 140 may represent a variety of information inputted by a user or offered to a user, including various menu pages of the mobile device 100. The display unit 140 may be formed of LCD (liquid crystal display), OLED (organic light emitting diodes), or any other equivalent. If being formed of a touch screen, the display unit 140 may further act as the input unit 120. Particularly, the display unit 140 may display a preview image or a saved image acquired by the first camera 170. Additionally, the display unit 140 may display at one specific region a real-time image acquired by the second camera 180 and also display at other specific region an image received from other mobile device through the RF unit 110.

The memory unit 150 may store a variety of programs and data required for the operation of the mobile device 100. The memory unit 150 may consist of a program region and a data region.

The program region may store an operating system (OS) for controlling the whole operation of the mobile device 100, applications required for the playback of multimedia contents, and the like. Particularly, the program region according to an embodiment of this invention may store an image acquisition application for controlling the first camera 170, a video call application based on the second camera 180, and an EMI reduction application.

The image acquisition application may be activated when a user requests enabling of the first camera 170 by selecting a specific menu item or key. Specifically, the image acquisition application may contain a routine for enabling the first camera 170, a routine for setting environments of the first camera 170 depending on default conditions or user's manipulation, a routine for outputting a preview image acquired by the first camera 170 on the display unit 140, a routine for capturing a specific image according to an input signal received from the input unit 120, a routine for saving the captured image according to an input signal received from the input unit 120, and the like.

The video call application may be activated when a specific menu item or key is selected. Specifically, the video call application may contain a routine for enabling the second camera 180 according to an input signal for initiating a video call after selecting one of other mobile devices, a routine for enabling the second camera 180 according to a response signal created in response to a request for a video call from other mobile device, a routine for outputting an image acquired by the second camera 180 at a specific region on the display unit 140, a routine for transmitting an image acquired by the second camera 180 to other mobile device, a routine for outputting an image received from other mobile device at a specific region on the display unit 140, and the like.

The EMI reduction application may contain a routine for controlling the flow of signals so that, when the first camera 170 is enabled, a signal delivered between the control unit 160 and the first camera 170 may not be transmitted to the second camera 180. Additionally, the EMI reduction application may further contain a routine for controlling the flow of signals so that, when the second camera 180 can acquire a high-resolution image above a given level and is enabled, a signal delivered between the control unit 160 and the second camera 180 may not be transmitted to the first camera 170. Substantially, by means of a routine for controlling the switch 190, the EMI reduction application may control the flow of signals whenever the first and second cameras 170 and 180 are selectively enabled.

The data region may store data created while the mobile device 100 is used. For example, the data region may store a phonebook, audio data, contents, user-related data, and the like. Particularly, the data region may store an image acquired when the first camera 170 is enabled, an image recorded according to a user's manipulation when the second camera 180 is enabled, and the like.

Each of the first and second cameras 170 and 180 basically offers a function for acquiring an image. The first camera 170 is enabled depending on an input signal from the input unit 120 and may offer a function dedicated to acquisition of a high-resolution image above a given level. The second camera 180 is enabled depending on an input signal from the input unit 120 and may offer a video call function in which a relatively lower-resolution image is acquired and sent to other mobile device.

Each of the first and second cameras 170 and 180 may include a camera sensor for converting an optical signal into an electric signal, an image signal processor for converting an analog image signal into a digital image signal, a digital signal processor for performing given processing (e.g., scaling, noise-removing, RGB signal conversion, and the like) for a digital image signal, and the like. The camera sensor may employ a CCD (charge coupled device) sensor, a CMOS (complementary metal oxide semiconductor) sensor, or any other equivalent. If necessary, the digital signal processor may be omitted.

The first and second cameras 170 and 180 may be disposed at different positions in the mobile device 100. For example, when the display unit 140 is formed on the front side of the mobile device 100, the first camera 170 may be disposed on the back side. However, the second camera 180 may be disposed on the front side so as to support a video call. Additionally, each of the first and second cameras 170 and 180 may be formed to allow some rotations on a pivot. Meanwhile, the first camera 170 may acquire a higher-resolution image in comparison with the second camera 180. For example, the first camera 170 may support a high resolution such as 30 mega pixels or 100 mega pixels, and the second camera 180 may support a relatively lower resolution.

A signal distance between the control unit 160 and each camera 170 or 180 may be varied according to the position of the camera 170 or 180 in the mobile device 100. For example, when the first camera 170 is disposed on the same face as a battery is attached, a signal distance between the first camera 170 and the control unit 160 may be designed shorter in comparison with the second camera 180. The signal distance may correspond to a signal line from a hardware viewpoint. Therefore, a signal line between the first camera 170 and the control unit 160 may be formed shorter than that between the second camera 180 and the control unit 160.

The switch 190 is disposed between the first and second cameras 170 and 180. Particularly, the switch 190 controls the flow of a main signal transmitted from the control unit 160 to the first or second camera 170 or 180 and the flow of an image signal transmitted from the first or second camera 170 or 180 to the control unit 160. Specifically, under the control of the control unit 160, the switch 190 may perform switching to deliver a main signal to only the first camera 170 when the first camera 170 is enabled, and also may perform switching to deliver a main signal to only the second camera 180 when the second camera 180 is enabled. Additionally, when the first camera 170 is enabled, the switch 190 may prevent an image signal of the first camera 170 from flowing through a signal line between the second camera 180 and the control unit 160. Furthermore, when the second camera 180 is enabled, the switch 190 may allow an image signal of the second camera 180 to be delivered to the control unit 160 regardless of whether to flow to a signal line between the first camera 170 and the control unit 160. Substantially, the first and second cameras 170 and 180 may share a part of a signal line connected to the control unit 160 in order to minimize a hardware configuration.

Figure 2:
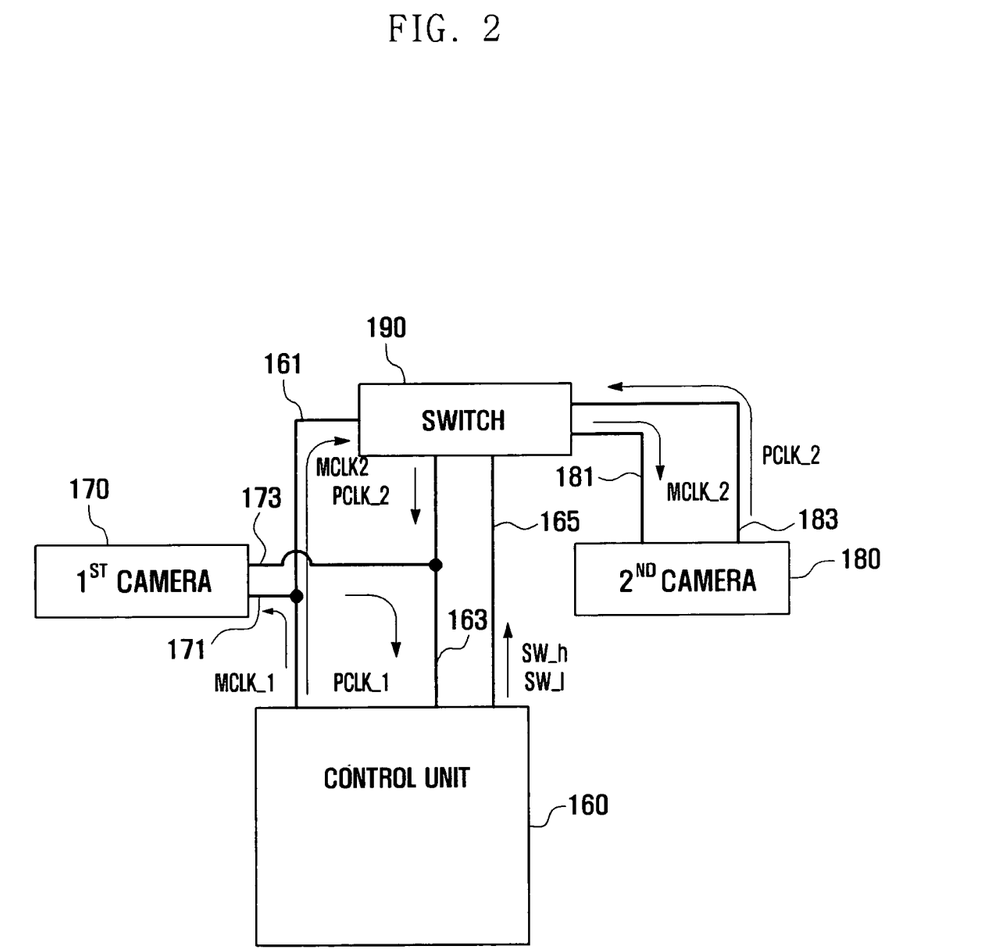
FIG. 2 illustrates signal lines among a control unit and cameras in accordance with an exemplary embodiment of the present invention.

The control unit 160 may control the whole operation of the mobile device 100 and the flow of signals among internal blocks of the mobile device 100. Additionally, the control unit 160 may control a data processing function, and the like. Particularly, the control unit 160 according to an embodiment of this invention controls the first and second cameras 170 and 180 depending on an input signal received from the input unit 120. At this time, the control unit 160 controls the switch 190 so that signals may use specific signal lines only. For this, the control unit 160 may use a control unit signal line, a first camera signal line, and a second camera signal line. As shown in FIG. 2 to be described below, the control unit signal line has a main signal transmitting line 161, an image signal receiving line 163, and a switch signal line 165, each of which is formed between the control unit 160 and the switch 190. Also, the first camera signal line includes a first camera signal transmitting line 171 and a first camera signal receiving line 173, each of which is formed between the first camera 170 and the switch 190. In addition, the second camera signal line includes a second camera signal transmitting line 181 and a second camera signal receiving line 183, each of which is formed between the second camera 180 and the switch 190. These signal lines may be varied according to shape, position, and so forth, of the switch 190. A detailed description will be given below with reference to FIG. 2.

FIG. 2 illustrates signal lines formed among the first camera 170, the second camera 180, the switch 190 and the control unit 160 in accordance with an exemplary embodiment of the present invention.

Referring to FIG. 2, the mobile device 100 may include the control unit signal line formed between the control unit 160 and the switch 190, the first camera signal line formed among the control unit 160, the first camera 170 and the switch 190, and the second camera signal line formed between the second camera 180 and the switch 190. Specifically, the control unit signal line includes the main signal transmitting line 161, the image signal receiving line 163, and the switch signal line 165. The first camera signal line includes the first camera signal transmitting line 171 connecting the first camera 170 and the main signal transmitting line 161, and the first camera signal receiving line 173 connecting the first camera 170 and the image signal receiving line 163. The second camera signal line includes the second camera signal transmitting line 181 and the second camera signal receiving line 183 both of which are formed between the second camera 180 and the switch 190.

The control unit 160 may transmit a main signal through the main signal transmitting line 161. Namely, the control unit 160 may send a first camera main clock signal (MCLK1) for controlling the first camera 170 and also may send a second camera main clock signal (MCLK2) for controlling the second camera 180. In particular, when operating the first camera 170, the control unit 160 controls the switch 190 so that the first camera main clock signal (MCLK1) may not be delivered to the second camera 180. Additionally, the switch 190 may prevent a first camera image signal (PCLK1) of the first camera 170 from flowing to the second camera 180.

Specifically, in order to activate an image acquisition function based on the first camera 170 at a user's request, the control unit 160 may send a switch control signal for controlling the state of the switch 190 to the switch 190. Namely, the control unit 160 sends a switch-off signal (SW_l) to the switch 190 through the switch signal line 165 so as to keep the switch 190 in an off-state. Also, the control unit 160 sends the first camera main clock signal (MCLK1) to the first camera 170 through the main signal transmitting line 161 and the first camera signal transmitting line 171. Then the first camera 171 is initialized to acquire an image, depending on the first camera main clock signal (MCLK1) received from the control unit 160. When receiving an input signal for image acquisition, the first camera 170 acquires an image and then sends the first camera image signal (PCLK1) corresponding to an acquired image to the control unit 160 through the first camera signal receiving line 173 and the image signal receiving line 163. Like this, the control unit 160 and the first camera 170 not only offer a function dedicated to image acquisition, but also prevent the first camera main clock signal (MCLK1) and the first camera image signal (PCLK1) from flowing to the second camera 180 by keeping the switch 190 in an off-state. Therefore, the mobile device 100 of this invention may prevent signals related to higher-resolution pixels from flowing toward the second camera 180 having longer signal lines than the first camera 170, thus minimizing EMI that may be caused by such signals delivered through long signal lines. In case where the second camera 180 is disposed on the same side as the display unit 140, a signal line connecting the second camera 180 and the control unit 160 may become structurally longer. In this structure, the above way to block the flow of signals may achieve magnificent effects on a reduction in EMI.

Alternatively, when operating the second camera 180 at a user's request, the control unit 160 sends a switch-on signal (SW_h) to the switch 190 through the switch signal line 165 so as to keep the switch 190 in an on-state. Also, the control unit 160 sends the second camera main clock signal (MCLK2) to the switch 190 through the main signal transmitting line 161. Then the switch 190 sends the second camera main clock signal (MCLK2) to the second camera 180 through the second camera signal transmitting line 181. Here, since the first camera 170 is disabled, the first camera 170 does not perform any operation depending on the above signal. Additionally, when the second camera 180 acquires an image, a second camera image signal (PCLK2) corresponding to an acquired image may be sent to the control unit 160 through the second camera signal receiving line 183, the switch 190 and the image signal receiving line 163. Here, since the second camera 180 supports lower-resolution pixels than the first camera 170, a small amount of signals may be transmitted and received at a low speed. Therefore, even though a signal transmitted to or received from the second camera 180 flows through the first camera signal transmitting line 171 and the first camera signal receiving line 173 connected to the first camera 170, EMI of the mobile device 100 may be not much affected by such a signal.

As discussed heretofore, a camera operating apparatus of the mobile device 100 according to an embodiment of this invention prevents signals related to the first camera 170 from being delivered to signal lines connected to the second camera 180 when operating the first camera 170 that transmits and receives a relatively larger amount of signals. Therefore, this may minimize EMI that may be caused by such signals.

Figure 3:
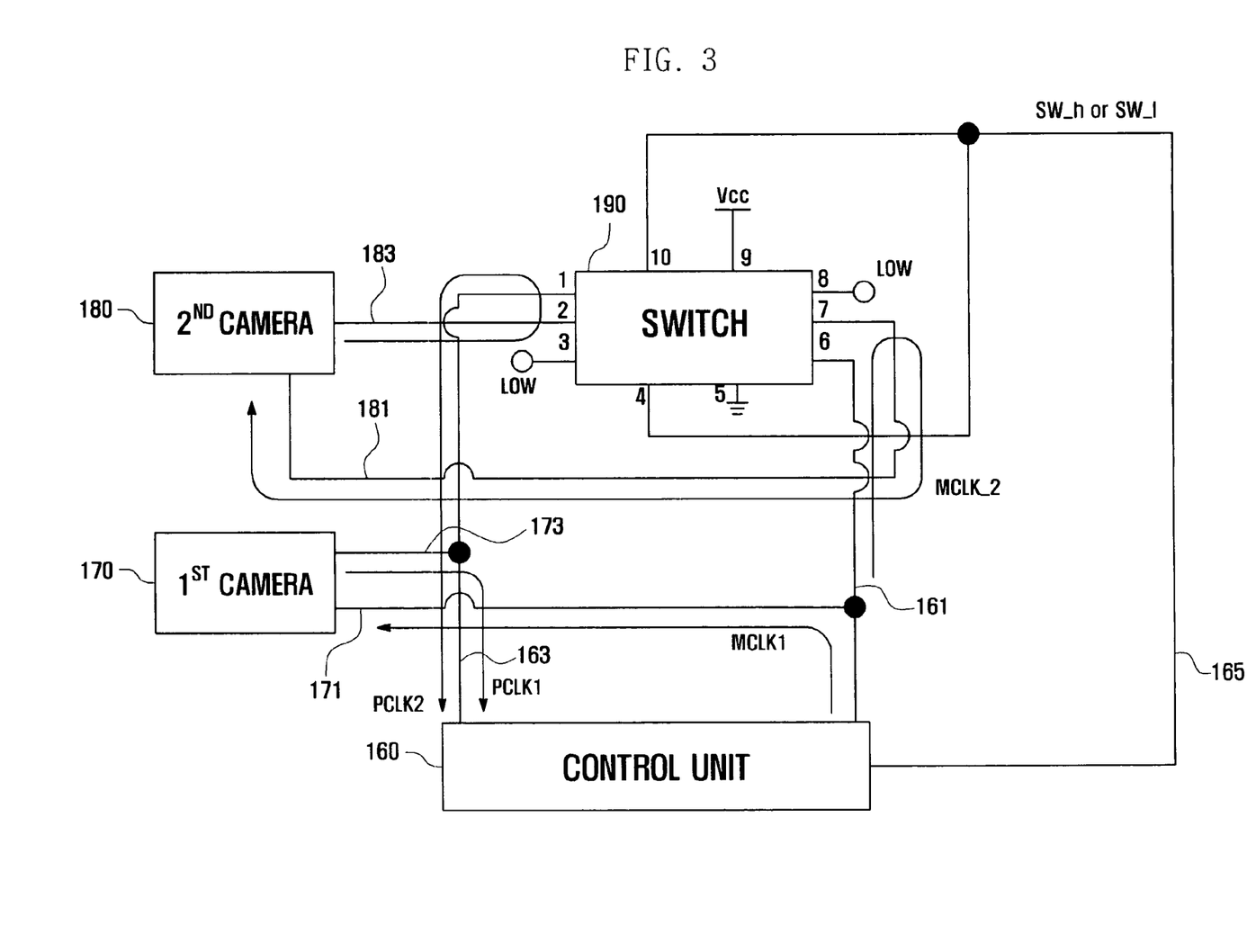
FIG. 3 illustrates signal lines when a specific type of switch is applied.

FIG. 3 illustrates signal lines formed among the first camera 170, the second camera 180 and the control unit 160 in case of using the switch 190 that has ten pins and two internal switching members. In addition, FIG. 4 illustrates an internal configuration of the switch 190 shown in FIG. 3.

Figure 4:
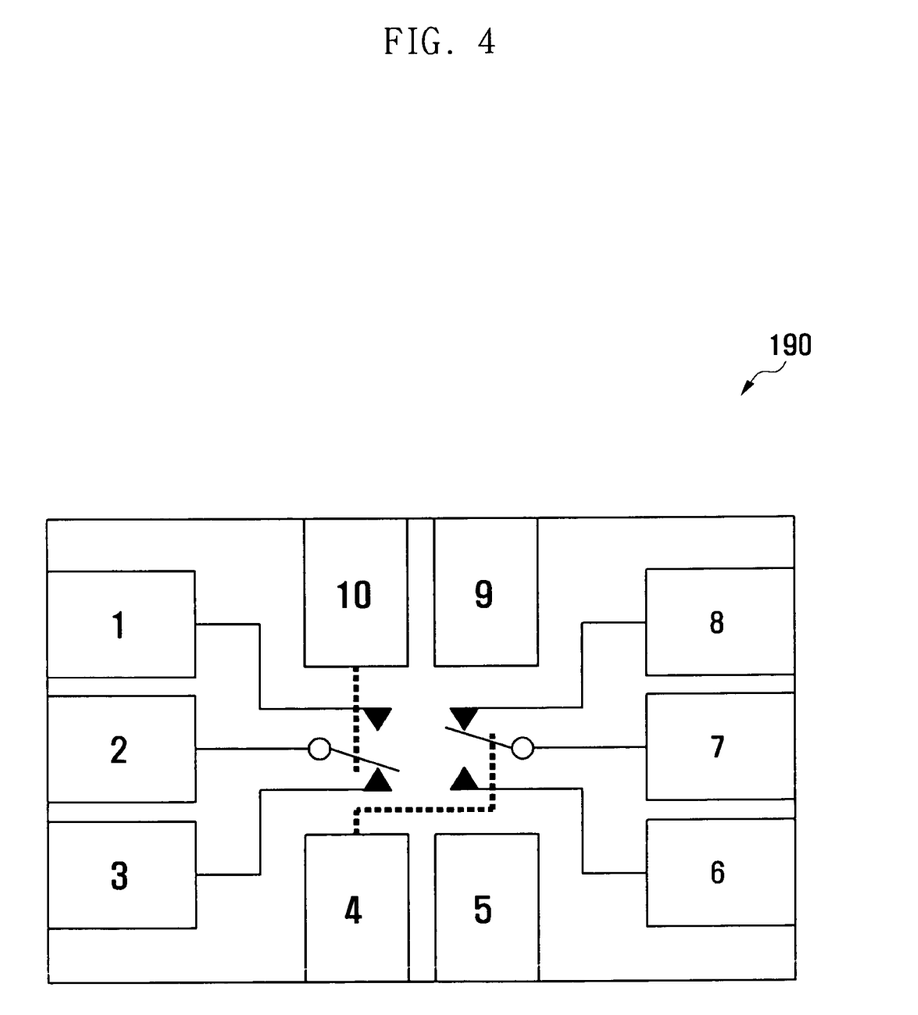
FIG. 4 illustrates an internal configuration of the switch shown in FIG. 3.

Referring to FIGS. 3 and 4, the mobile device 100 includes the main signal transmitting line 161 and the image signal receiving line 163 formed between the control unit 160 and the switch 190, and also includes the switch signal line 165 for controlling the switch 190. The switch signal line 165 is connected to a specific port of the control unit 160 and also connected to the fourth port 4 and the tenth port 10 of the switch 190. Additionally, the mobile device includes the first camera signal transmitting line 171 connecting the first camera 170 and the main signal transmitting line 161, and the first camera signal receiving line 173 connecting the first camera 170 and the image signal receiving line 163. Furthermore, the mobile device includes the second camera signal transmitting line 181 connecting the second camera 180 and the seventh port 7 of the switch 190, and the second camera signal receiving line 183 connecting the second camera 180 and the second port 2 of the switch 190.

The tenth and fourth ports 10 and 4 of the switch 190 transmit a signal for controlling switching members internally coupled to the second and seventh ports 2 and 7, respectively. Namely, the control unit 160 provides a switch-on signal (SW_h) or a switch-off signal (SW_l) to the tenth and fourth ports 10 and 4. When the switch-on signal (SW_h) is supplied to the tenth port 10, a switching member coupled to the second port 2 electrically connects the first and second ports 1 and 2. Additionally, when the switch-on signal (SW_h) is supplied to the fourth port 4, a switching member coupled to the seventh port 7 electrically connects the sixth and seventh ports 6 and 7. Alternatively, when the switch-off signal (SW_l) is supplied to the tenth port 10, a switching member coupled to the second port 2 electrically connects the third and second ports 3 and 2. In addition, when the switch-off signal (SW_l) is supplied to the fourth port 4, a switching member coupled to the seventh port 7 electrically connects the eighth and seventh ports 8 and 7. The third and eighth ports 3 and 8 are designed to be grounded or in a floating state so that a signal produced by the control unit 160 or by the first camera 170 may not be delivered to signal lines connected to the second camera 180. Meanwhile, the ninth port 9 is supplied with a reference voltage, and the fifth port 5 is a ground port.

As discussed heretofore, the mobile device 100 according to an embodiment of this invention properly controls the flow of signals delivered through signal lines that are formed between the first camera 170 and the control unit 160 and between the second camera 180 and the control unit 160. Therefore, the mobile device 100 can minimize EMI that may be caused by signals flowing through the respective signal lines.

Although the above embodiment employs a specific type of switch 190 having ten pins, the present invention is not limited thereto. Any other types of switches having fewer or more pins may be alternatively employed for the present invention. Additionally, even though in the above example the switch 190 is formed between the second camera 180 and the control unit 160, independently of the first camera 170, the switch 190 of this invention may be connected to both the first and second cameras 170 and 180 as shown in FIG. 1 and also may select signal lines connected to a specific camera under the control of the control unit 160.

Now, a method for operating plural cameras in the mobile device will be described in detail.

Figure 5:
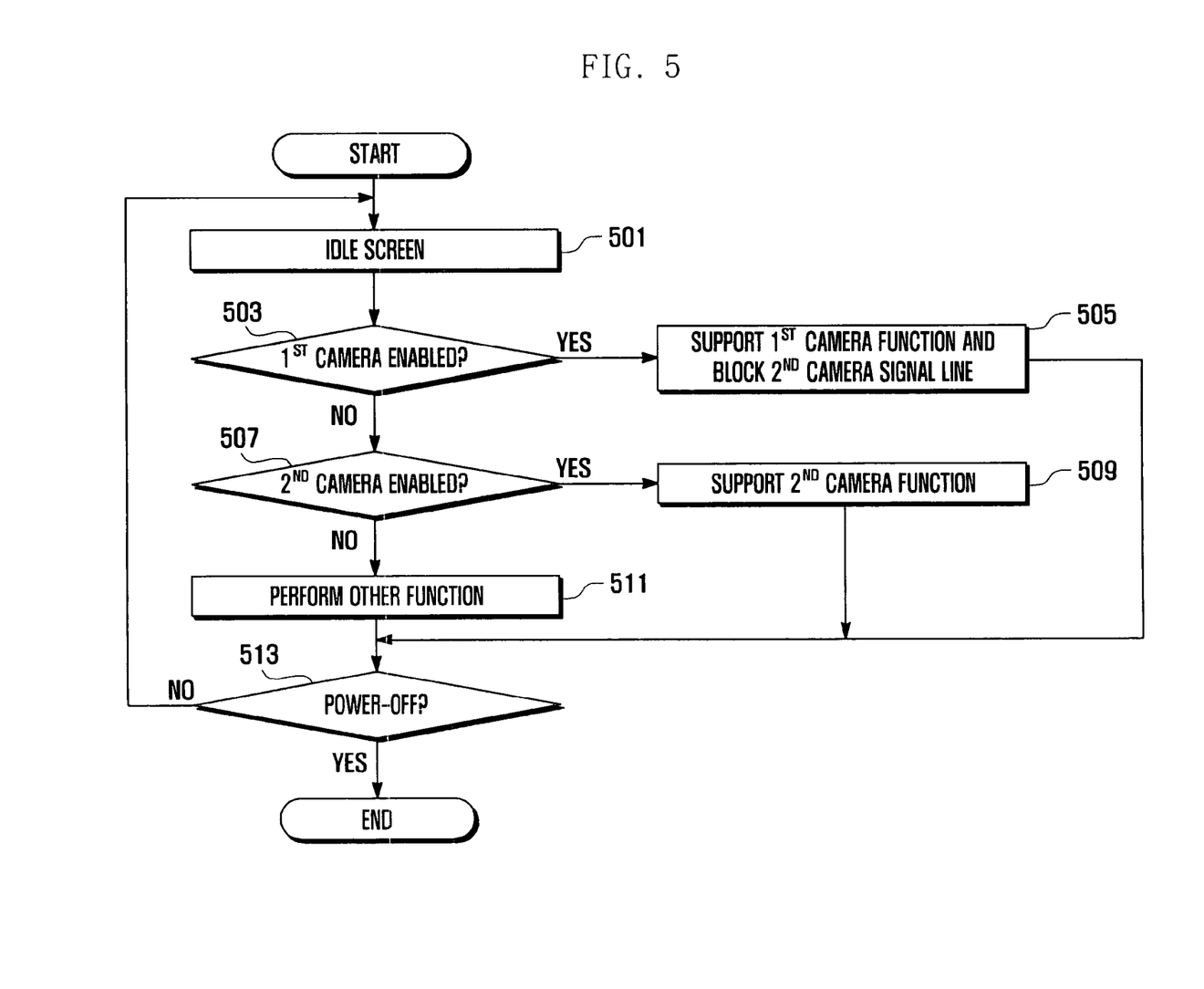
FIG. 5 illustrates a process for operating plural cameras in a mobile device in accordance with an exemplary embodiment of the present invention.

FIG. 5 illustrates a method for operating plural cameras in a mobile device in accordance with an exemplary embodiment of the present invention.

Referring to FIGS. 1 to 5, after power is supplied, the mobile device 100 performs a booting process and then outputs a predefined idle screen on the display unit 140 (step 501). In this step, if there is no input signal for a given time, the mobile device 100 may enter a sleep mode. Thereafter, if receiving a specific input signal in the sleep mode, the mobile device 100 may output the idle screen or a certain screen offered by a particular application that has been executed just before entering the sleep mode.

Next, the mobile device 100 determines whether an input signal for enabling the first camera 170 is received from the input unit 120 (step 503). For example, if an input signal is to activate a function for acquiring an image through the first camera 170, the mobile device 100 enables the first camera 170. Here, when a user selects a specific menu item or key of the input unit 120 defined for enabling the first camera 170, an input signal for enabling the first camera 170 is created.

If receiving an input signal for enabling the first camera 170 in the step 503, the mobile device 100 supports a prearranged function based on the first camera 170 such as an image acquisition function and also blocks the flow of signals toward the second camera 180 (step 505). Specifically, by using the switch 190 disposed between the second camera 180 and the control unit 160, the mobile device 100 can prevent a signal delivered between the control unit 160 and the first camera 170 from flowing toward signal lines formed between the second camera 180 and the control unit 160.

If there is no input signal for enabling the first camera 170 in the aforesaid step 503, the mobile device 100 further determines whether an input signal for enabling the second camera 180 is received from the input unit 120 (step 507). If receiving an input signal for enabling the second camera 180 in the step 507, the mobile device 100 supports a prearranged function based on the second camera 180 such as a video call function (step 509). In this step, if an image acquired by the second camera 180 is too low in resolution to affect EMI of the mobile device 100, in other words, if the amount and speed of signals the second camera 180 sends to or receives from the control unit 160 for supporting a video call is insignificant, it may be not required to control the flow of signals for the purpose of reducing EMI.

Specifically, if EMI of the mobile device is not much affected by the flow of signals based on the second camera 180, the mobile device 100 may adopt the configuration of signal lines as shown in FIGS. 2 to 4. Namely, if the first camera 170 is directly connected to the control unit 160 and if the second camera 180 is connected to the control unit 160 via the switch 190, the mobile device 100 may not block the flow of signals in signal lines formed between the first camera 170 and the control unit 160 in case of enabling the second camera 180. However, if the second camera 180 sends and receives a large amount of data at a high speed, it is desirable that the mobile device 100 prevents a signal delivered between the second camera 180 and the control unit 160 from flowing toward signal lines connected to the first camera 170. In this case, the mobile device 100 may dispose the switch 190 as shown in FIG. 1.

Meanwhile, if an input signal received in the aforesaid step 507 is not to enable the second camera 180, the mobile device 100 performs a particular function corresponding to a received input signal (step 511). For example, the mobile device 100 may perform a voice call function, a file play function, a web access function, a file search function, a game function, and the like, depending on the received input signal.

Thereafter, the mobile device 100 determines whether to turn off the power (step 513). If there is no input signal for power-off, the mobile device 100 returns to the previous step 501 and then repeats the aforesaid steps.

As discussed heretofore, the method for operating plural cameras in the mobile device according to an embodiment of this invention controls the flow of signals so that a signal delivered between the enabled camera and the control unit may not be transmitted to signal lines formed between the disabled cameras and the control unit. Therefore, this method can minimize EMI caused by a signal delivered between the enabled camera and the control unit.

Figure 6:
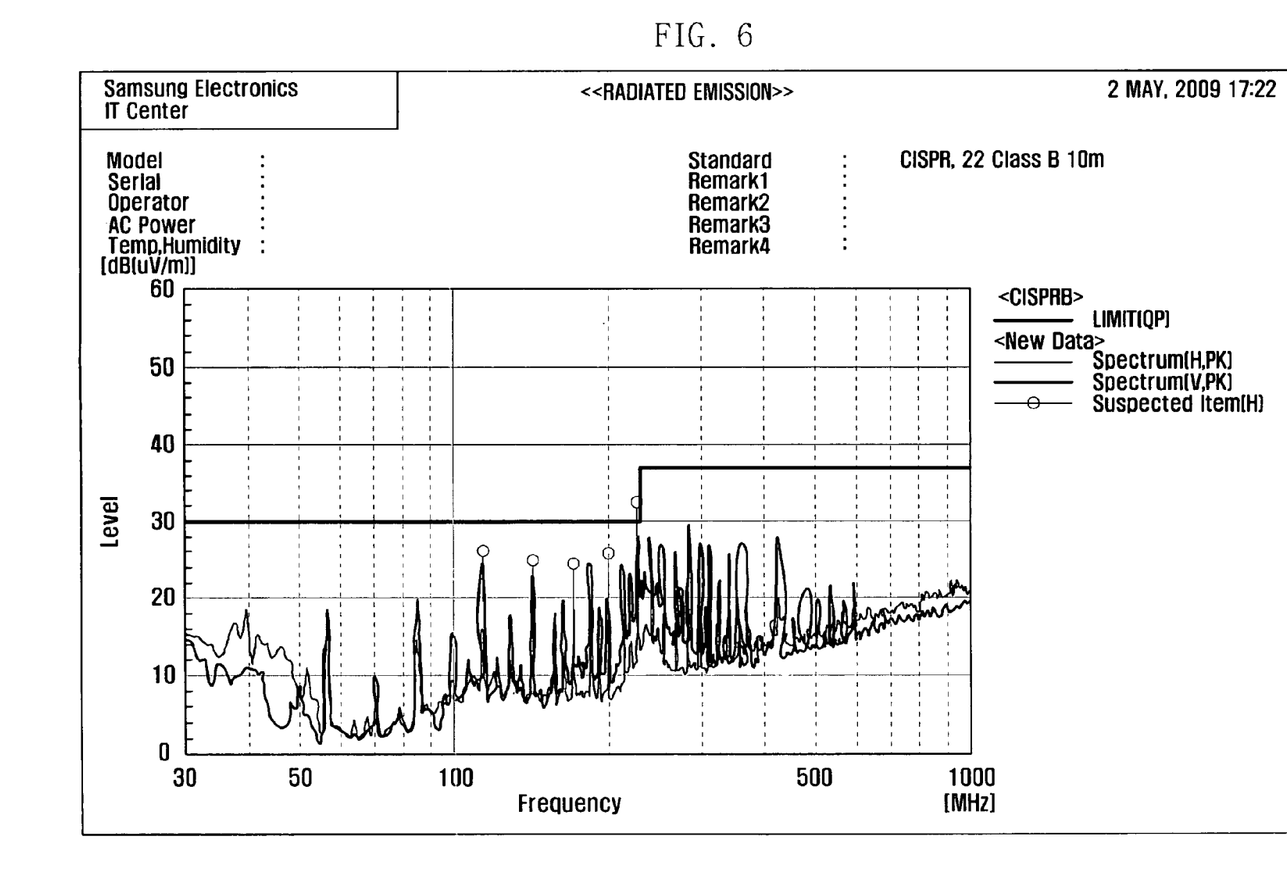
FIG. 6 illustrates EMI characteristics measured in a conventional mobile device.
Figure 7:
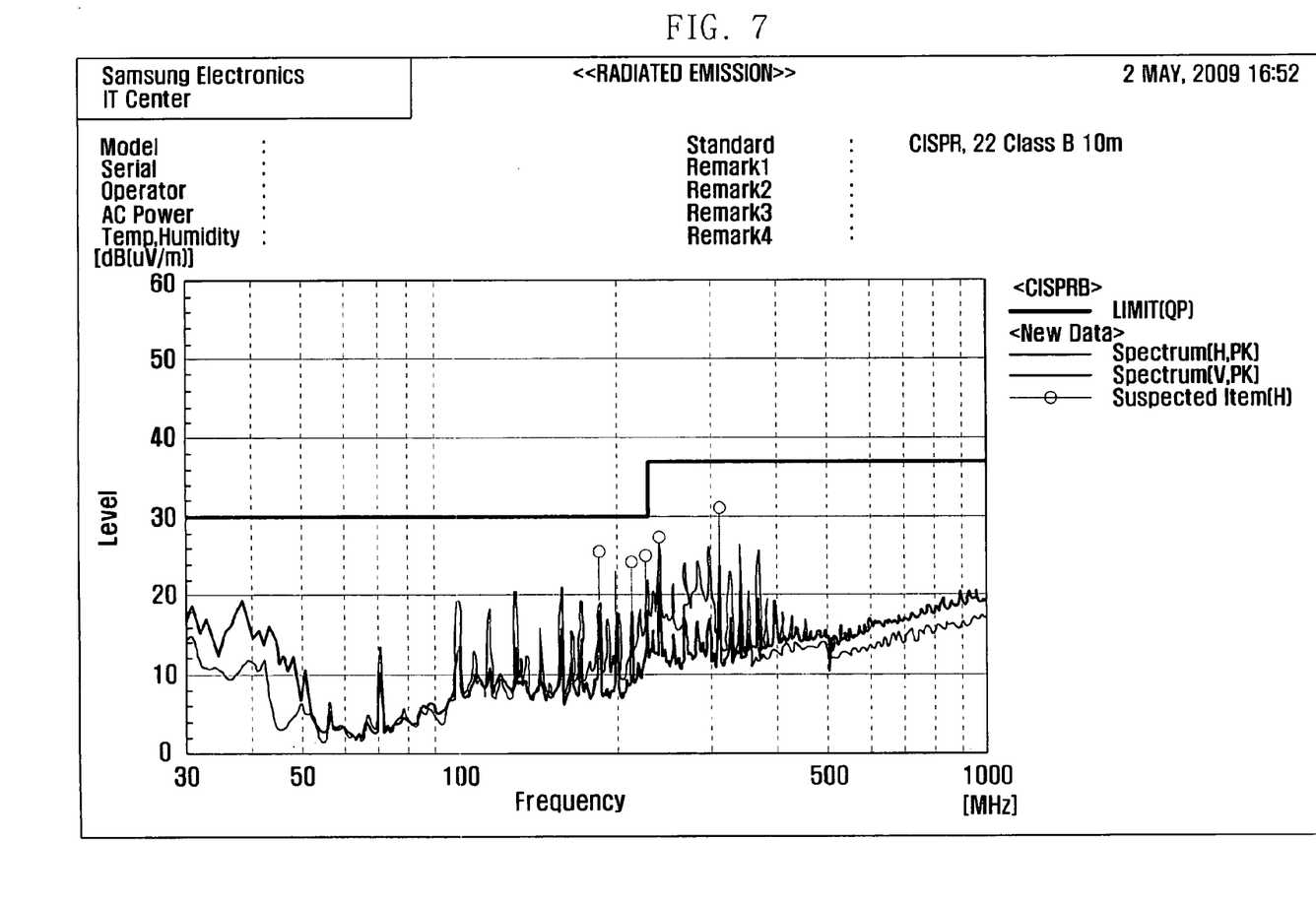
FIG. 7 illustrates EMI characteristics measured in a mobile device in accordance with an exemplary embodiment of the present invention.

FIG. 6 illustrates EMI characteristics measured in a conventional mobile device, whereas FIG. 7 illustrates EMI characteristics measured in a mobile device in accordance with an exemplary embodiment of the present invention.

As shown in FIG. 6, EMI measured in a conventional mobile device results in a spectrum that approaches 30 level in a range of 100~500 MHz and, what is worse, partly exceeds the allowable limit (LIMIT[QP]). Therefore, in a conventional mobile device, EMI may not only offer electromagnetically an adverse effect upon the device, but also cause unexpected errors in operation and a data loss during a video call.

Alternatively, as shown in FIG. 7, EMI measured in the invented mobile device results in a spectrum with a relatively lower level in the entire frequency and also does not exceed the allowable limit at all. Therefore, it is possible to support a more suitable operation of the mobile device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus configured to operate cameras in a mobile device, the apparatus comprising:
   a first camera and a second camera each configured to offer an image acquisition function;
   a control unit configured to send and receive a signal to and from each of the first and second cameras;

a switch configured to perform switching under the control of the control unit so that a signal in connection with an enabled one of the first and second cameras may not be transmitted to a disabled one of the first and second cameras;

a control unit signal line formed between the switch and the control unit; and a first camera signal line directly connected to a part of the control unit signal line and formed between the first camera and the control unit.

2. The apparatus of claim 1, further comprising:
a second camera signal line formed between the switch and the second camera.

3. The apparatus of claim 2, wherein the switch is further configured to prevent a signal in connection with the first camera from flowing to signal lines formed between the second camera and the switch when the first camera is enabled.

4. The apparatus of claim 2, wherein the control unit signal line includes:
a switch signal line for controlling the switch;
a main signal transmitting line for sending a main signal for controlling the first camera or the second camera; and
an image signal receiving line for receiving an image signal sent from the first camera or the second camera.

5. The apparatus of claim 2, wherein the control unit is configured to determine whether signals from the second camera cause electromagnetic interference in the mobile device to exceed a threshold according to the second camera being enabled.

6. The apparatus of claim 5, wherein the first camera signal line is further formed between the switch and the first camera, wherein the switch is further configured to prevent signals from the second camera from flowing on the first camera signal line when the signals from the second camera causes electromagnetic interference in the mobile device to exceed a threshold.

7. The apparatus of claim 5, wherein the control unit signal line includes:
a switch signal line for controlling the switch;
a main signal transmitting line for sending a main signal for controlling the first camera or the second camera; and
an image signal receiving line for receiving an image signal sent from the first camera or the second camera.

8. The apparatus of claim 1, wherein the first camera is capable of acquiring a higher-resolution image in comparison with the second camera.

9. The apparatus of claim 1, wherein the second camera supports a video call function.

10. A method for operating cameras in a mobile device, the method comprising:
receiving an input signal for enabling a specific one of a plurality of cameras;
enabling the specific camera in response to the input signal; and
controlling, by a switch under control of a control unit, a flow of signals so that a signal in connection with the enabled camera may not be delivered to a disabled camera and signal lines connected to the disabled camera,
wherein a signal line to one of the enabled camera and the disabled camera is directly connected to a part of a control unit signal line formed between the switch and the control unit and the signal line is formed between the control unit and the one of the enabled camera and the disabled camera.

11. The method of claim 10, wherein the controlling step includes at least one of:

blocking signal lines formed between a control unit and the disabled camera by controlling a switch so that a main signal for controlling the enabled camera may not be delivered to the disabled camera; and blocking the signal lines formed between the control unit and the disabled camera by controlling the switch so that an image signal acquired by the enabled camera may not be delivered to the disabled camera.

12. The method of claim 10, wherein the controlling step includes at least one of:
blocking signal lines formed between a switch and the disabled camera by controlling the switch so that a main signal for controlling the enabled camera may not be delivered to the disabled camera; and
blocking the signal lines formed the switch and the disabled camera by controlling the switch so that an image signal acquired by the enabled camera may not be delivered to the disabled camera.

13. The method of claim 10, wherein the input signal is to enable a specific camera that supports a function dedicated to image acquisition.

14. The method of claim 10, wherein the input signal is to enable a specific camera for acquiring a relatively higher-resolution image among the plural cameras.

15. A mobile device comprising:
a first camera and a second camera each configured to offer an image acquisition function;
a control unit configured to send and receive a signal to and from each of the first and second cameras;
a switch configured to perform switching under the control of the control unit so that a signal in connection with an enabled one of the first and second cameras may not be transmitted to a disabled one of the first and second cameras;
a control unit signal line formed between the switch and the control unit; and
a first camera signal line directly connected to a part of the control unit signal line and formed between the first camera and the control unit.

16. The mobile device of claim 15, further comprising:
a second camera signal line formed between the switch and the second camera.

17. The mobile device of claim 16, wherein the switch is further configured to prevent a signal in connection with the first camera from flowing to signal lines formed between the second camera and the switch when the first camera is enabled,
wherein the control unit signal line includes:
a switch signal line for controlling the switch;
a main signal transmitting line for sending a main signal for controlling the first camera or the second camera; and
an image signal receiving line for receiving an image signal sent from the first camera or the second camera.

18. The mobile device of claim 16, wherein the control unit is configured to determine whether signals from the second camera causes electromagnetic interference in the mobile device to exceed a threshold according to the second camera being enabled.

19. The mobile device of claim 18, wherein the first camera signal line is further formed between the switch and the first camera, and wherein the switch is further configured to prevent signals from the second camera from flowing on the first camera signal line when the signals from the second camera causes electromagnetic interference in the mobile device to exceed a threshold.

20. The mobile device of claim 15, wherein the first camera is capable of acquiring a higher-resolution image in comparison with the second camera, wherein the second camera supports a video call function.

* * * * *